United States Patent [19]
Boone et al.

[11] 3,883,808
[45] May 13, 1975

[54] RADIO

[76] Inventors: Joseph E. Boone, 4808 Eastbourne Dr., Indianapolis, Ind. 46226; Louis E. Schonegg, R.R. No. 3, Box 610 C, Brownsburg, Ind. 46112

[22] Filed: July 29, 1969

[21] Appl. No.: 845,683

[52] U.S. Cl. .......... 325/335; 325/471
[51] Int. Cl. .......... H04B 1/32
[58] Field of Search .......... 325/469, 334, 470, 31, 325/28, 452, 339, 455, 465, 468, 464; 331/161, 47, 49; 239/92; 334/47, 86, 87

[56] References Cited

UNITED STATES PATENTS

| | | | |
|---|---|---|---|
| 2,487,857 | 11/1949 | Davis | 331/161 |
| 2,495,020 | 1/1950 | Pifer | 334/21 |
| 2,553,366 | 5/1951 | Fry | 331/161 |
| 2,805,331 | 9/1957 | Wolford | 325/465 |
| 3,470,481 | 9/1969 | Myers et al. | 325/31 |
| 3,482,166 | 12/1964 | Gleason | 325/31 |
| 3,497,813 | 2/1970 | Gallagher | 325/456 |
| 3,531,724 | 9/1970 | Fathauer | 325/469 |
| 3,602,822 | 8/1971 | Evans | 325/464 |

*Primary Examiner*—Richard Murray

[57] ABSTRACT

An FM monitor type radio having indicator lights on its front face to indicate the particular frequency to which the radio is tuned. A digital counter driven by a multivibrator cycles the radio in order, through its various frequencies. The multivibrator is switchable from a free running state to a state in which it is actuated to drive the counter one position by means of a manual selector switch. The number of frequencies to which the radio tunes can be controlled by opening or closing one or more of a plurality of switches each of which is provided for a respective one of the frequencies.

18 Claims, 4 Drawing Figures

INVENTORS
JOSEPH E. BOONE
LOUIS E. SCHONEGG
BY
Woodard, Weikart, Emhardt & Naughton
ATTORNEYS INVENTORS
JOSEPH E. BOONE
LOUIS E. SCHONEGG
BY
Woodard, Weikart, Emhardt & Naughton
ATTORNEYS INVENTORS
JOSEPH E. BOONE
LOUIS E. SCHONEGG
BY
Woodard, Weikart, Emhardt & Naughton
ATTORNEYS

RADIO

BACKGROUND OF THE INVENTION

1. Field of the Invention:

This invention relates to a radio receiver.

2. Description of the Prior Art:

There are available on the market various types of radios intended for use in monitoring the two way communications of others. such radios might be used by volunteer firemen, by aircraft pilots, by watercraft operators and by professional newsmen, to mention only a few of the many applications. Consider, for example, a radio or television station representative whose job it is to personally cover any newsworthy fires or automobile accidents. He might have provided in his automobile a monitor type of radio which steps around from frequency to frequency locking on a frequency only if there is a transmission being effected on that frequency. In certain situations, such a person may desire to concentrate his attention on, for example, only two or three of the eight or more frequencies to which the radio is capable of tuning. Presently available radios do not permit easy and convenient limiting of the number of stations to which the radio tunes. An example, of the prior art is disclosed in U.S. Pat. No. 2,887,581 to Brown.

SUMMARY OF THE INVENTION

One embodiment of the invention might include radio apparatus comprising a radio receiver, said receiver being tunable to a given plurality of frequencies, means for stepping said receiver through said given plurality of frequencies in a regular order, means for locking said receiver on a given frequency as long as there is a signal received on that frequency, means for causing said stepping to be automatic, means for visually indicating the frequency to which the receiver is tuned. And means for manually eliminating any desired one or more of the frequencies from said plurality of frequencies.

Objects of this invention are to provide an improved radio receiver and to provide a radio receiver which cycles through a predetermined number of frequencies and can be easily and conveniently limited as to the number of frequencies through which it cycles.

DESCRIPTION OF THE PREFERRED EMBODIMENT

Figure 1:
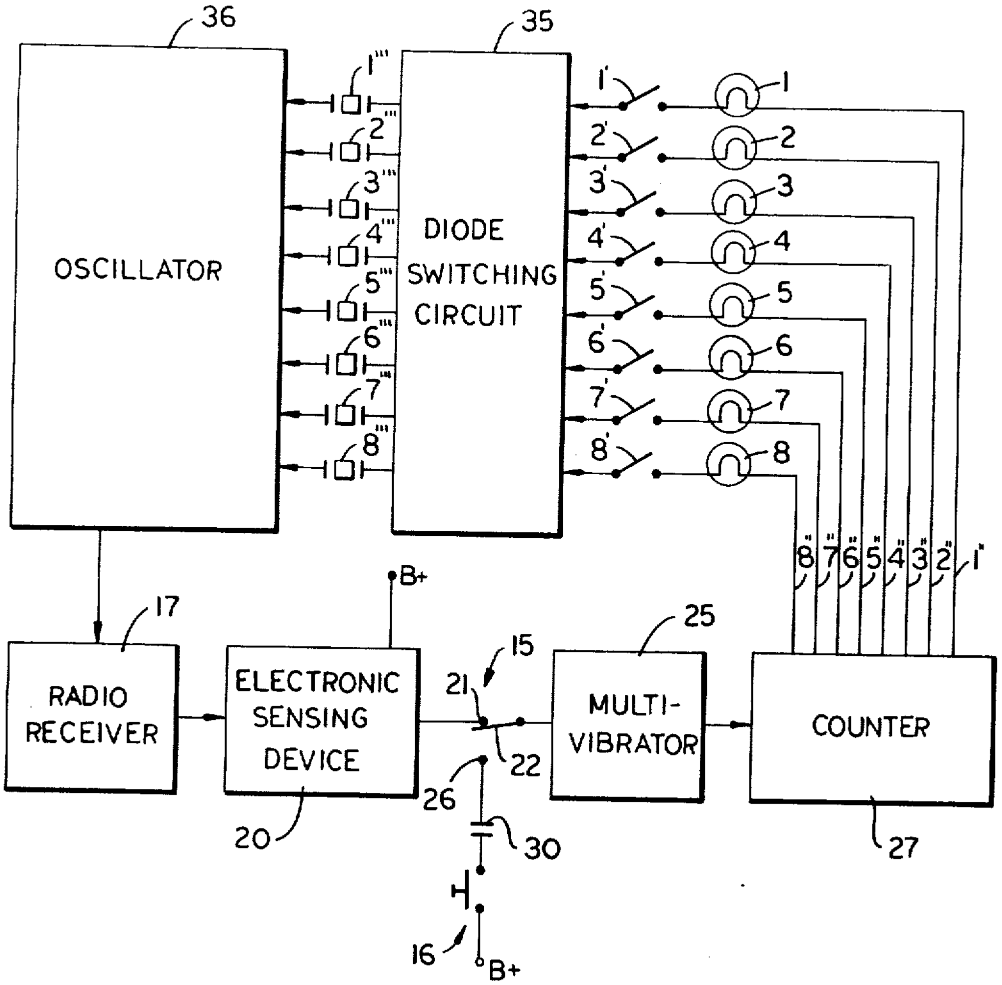
FIG. 1 is a schematic electrical block diagram of a radio receiver embodying this invention.
Figure 2:
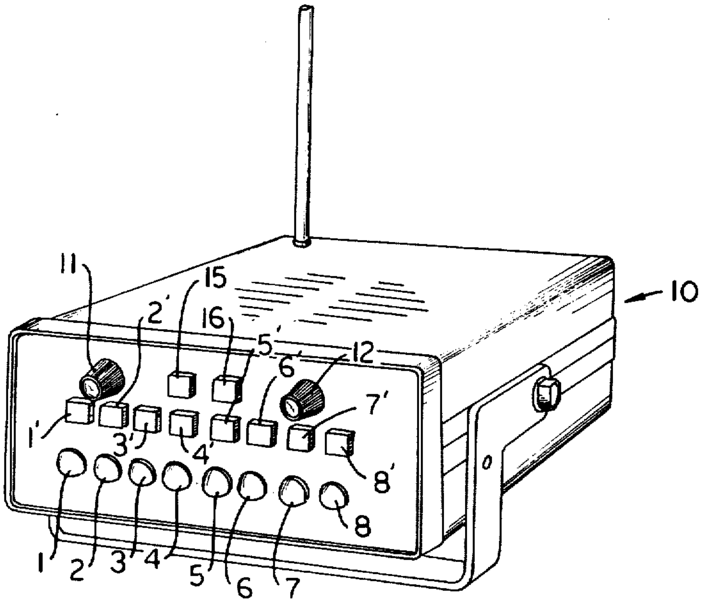
FIG. 2 is a perspective view of the radio receiver of this invention.

Referring more particularly to the drawings, there is illustrated an FM monitor type radio 10 which has on its front face an on-off switch 11 and a squelch knob 12. The radio is capable of receiving 8 different frequencies each of which is associated with a respective one of the lights 1–8, inclusive, and switches 1′–8′ inclusive. The radio has a two position switch 15 which permits selection of automatic operation or manual operation and also has a manual channel selector switch 16. As mentioned, the purpose of the radio is to monitor various radio frequencies. This is accomplished by the stepping at a constant rate through the various frequencies. When a frequency has a transmission on it, the radio locks on that frequency until the transmission stops.

Referring to FIG. 1, the radio receiver 17 is connected to an electronic switch 20 which places a B+ or DC voltage on the terminal 21 when the receiver 17 is tuned to a frequency on which there is no transmission. When the switch 15 is in the illustrated position with the contact 22 in engagement with the contact 21, the B+ is conducted to the multivibrator 25 causing it to run continuously. As the multivibrator runs, it drives the counter 27 causing it to place a signal, in order, on the lines 1″–8″ and to cause the receiver to be tuned in order to the various desired frequencies. The electronic sensing switch 20 is connected to the receiver 17 through the squelch circuit of the receiver. When the receiver is tuned to a frequency on which there is a transmission, the electronic sensing switch 20 is operated and no B+ is provided to the terminal 21. Consequently, the multivibrator does not run. Only when the transmission stops does the terminal 21 again receive the B+ so that the multivibrator is again caused to run.

The switch 15 may be operated so that the contact 22 engages and remains in engagement with the terminal 26. In this condition the manual selector switch 16 is used to tune the receiver to the various frequencies. The switch 16 is a push button type spring return switch. When the switch 16 is closed, a pulse of voltage is transmitted from B+ to the multivibrator causing the counter 27 to move one position. The capacitor 30 causes the voltage at the terminal 26 to quickly drop back so that further running of the multivibrator does not occur until B+ is again provided to the multivibrator.

As shown schematically in FIG. 1, the crystals 1‴ – 8‴ are located between the diode switching circuit 35 and the oscillator 36. Each of the crystals is associated with a respective one of the lines 1″–8″, a respective one of the lights 1–8 and a respective one of the switches 1′–8′. When all of the switches 1′–8′ are closed, the counter energizes each of the lights in order and places each of the crystals in the circuit of the oscillator so that the receiver is tuned to the frequency determined by each crystal. If one or more of the switches 1′–8′ is manually opened, the counter still cycles to and through the particular line 1″–8″ but because the particular switch is not closed, the particular light 1–8 is not turned on and the particular crystal 1‴ – 8‴ is not placed in the oscillator circuit. Consequently, that frequency is out of the cycle whether the receiver is manually stepped or automatically stepped.

Figure 3:
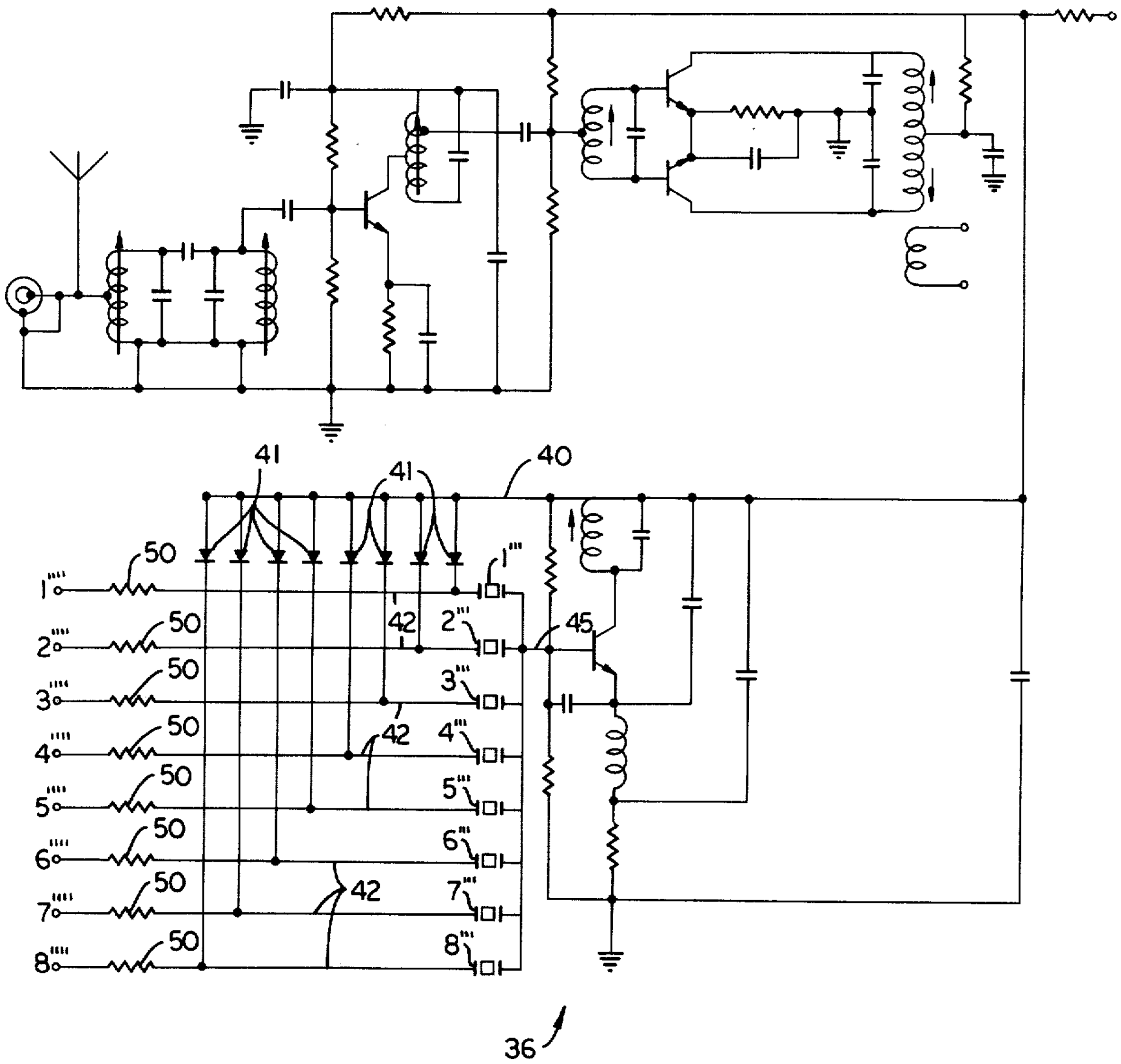
FIGS. 3 and 4 are schematic electrical diagrams of some of the circuitry of the radio receiver.
Figure 4:
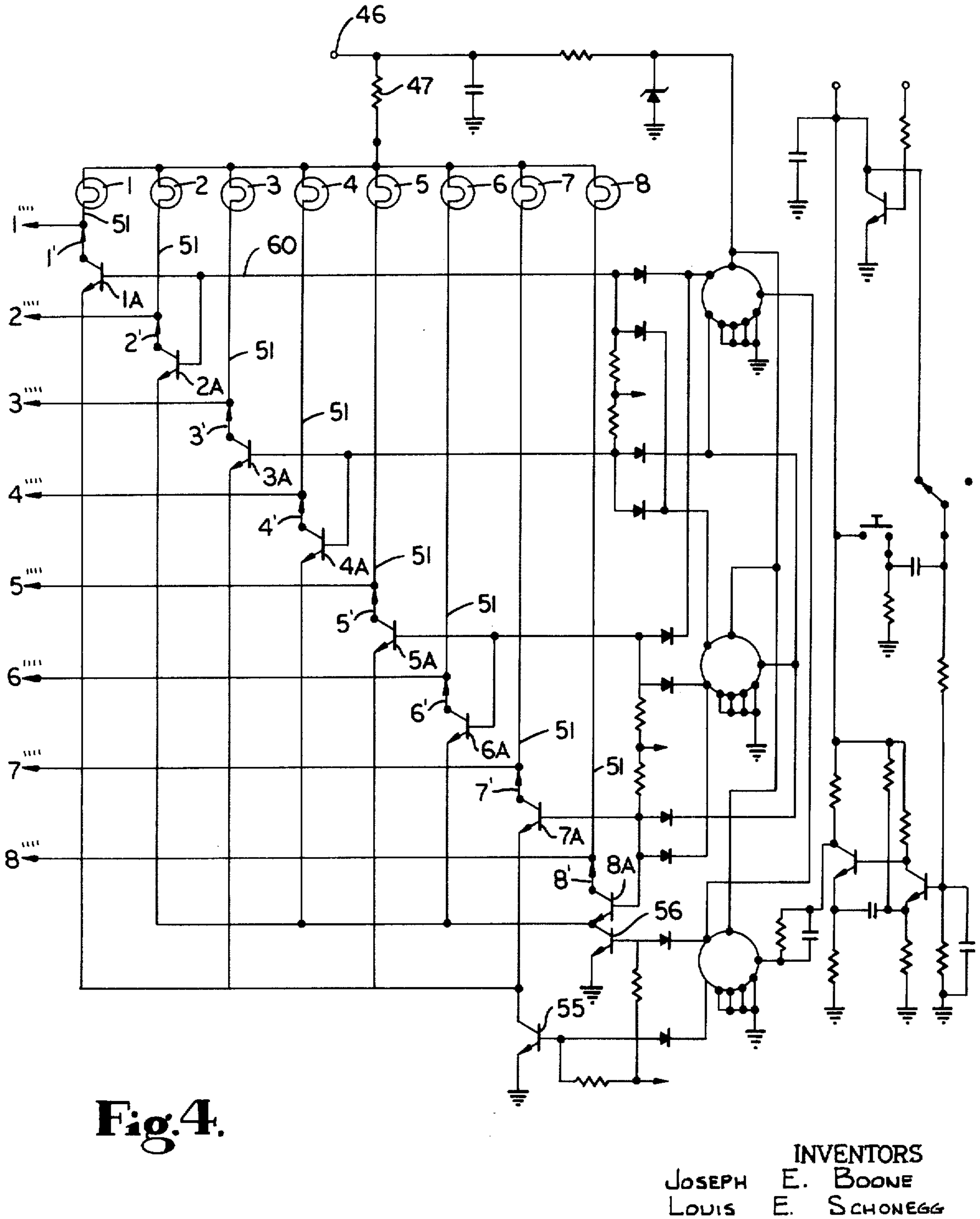

The manner in which the lights are turned on and the respective associated crystals are simultaneously used will be clear from FIGS. 3 and 4. In FIG. 3 the oscillator 36 has the respective crystals 1‴–8‴ connected in its circuit through the line 40, diodes 41, lines 42 and line 45. As long as the lines 42 have a sufficient high voltage thereon to back bias the diodes 41, no current flows through the crystals. The voltage, for example, at the line 40 in one specific embodiment of the invention is +8.5 volts. Referring to FIG. 4, the voltage supplied at point 46 is +13 volts. FIG. 3 connects to FIG. 4 at the points 1⁗ – 8⁗. Therefore, when the switches 1′–8′ are open, the voltage at the lines 42 is also 13 volts because there is no voltage drop through resistor 47 (33Ω ½ watts), or through the light bulbs 1–8 or through the resistors 50. Whenever any of the switches 1'–8' is closed, there is a voltage on the respective line 42 of approximately 10 volts because of voltage drop through the resistor 47 and the respective bulb 1–8. Still the voltage of 10 volts is not low enough to forward bias the respective diode 41.

As the counter steps along, however, it turns on the respective transistors 1A–8A and transistors 55 and 56 which drops the voltage on the terminal 51 of the respective lights 1–8 to a voltage close to ground so that the respective light is turned on. The turning on of the respective transistor drops the voltage on the respective terminal 51 to approximately 0.3 volts which turns on the respective diode 41 because it is now forward biased. Thus the respective crystal is placed in the oscillator circuit. As regards the counter operation, the transistors 1A and 2A are turned on at the same time through the line 60; however, the transistors 55 and 56 are alternated in being turned on. It can be appreciated therefore that the voltage at the terminals 51 cycles in order through the lights 1–8.

What is claimed is:

1. Radio apparatus comprising a radio receiver, said receiver being tunable to several different frequencies, means for stepping said receiver through said several frequencies in a regular order, means for locking said receiver on a given frequency as long as there is a signal received on that frequency, and for causing automatic resumption of said stepping after the signal ceases, means for causing said stepping to be automatic, means for visually indicating the frequency to which the receiver is tuned, squelch means for automatically muting the audio during said automatic stepping and switch means for manually precluding the operation of said locking means in response to signals on any selected single one of the frequencies while permitting operation of said locking means in response to signals on other frequencies of the several frequencies during said automatic stepping operation.

2. Radio apparatus as defined in claim 1 wherein the switch means includes several switches there being one switch associated with each frequency of said several frequencies.

3. Radio apparatus as defined in claim 2 in which said indicating means includes several lights, there being one light associated with each frequency of said several frequencies to indicate the channel to which the receiver is tuned.

4. Radio apparatus as defined in claim 3 in which each of said indicator lights is arranged to be fully energized at all times that the radio is tuned to the respective frequency.

5. Radio apparatus as defined in claim 2 in which said stepping means comprises a digital counter and a multivibrator driving said digital counter.

6. Radio apparatus as defined in claim 5 which additionally comprises means coupling said counter to said switches and to said crystals, said counter being arranged upon actuation by said multivibrator to deliver a signal in a regular order to said coupling means, said coupling means being associated with respective ones of said switches and respective ones of said crystals whereby the opening of any desired one or more of said switches prevents said counter from delivering a signal through the switch to the respective crystal.

7. Radio apparatus as defined in claim 6 in which said indicating means includes several indicator lights, each of said indicator lights being connected to said coupling means and controlled by a respective one of said switches wherein said indicator lights indicate which of said crystals is operating and the frequency to which said radio apparatus is tuned.

8. Radio apparatus as defined in claim 1 in which said several frequencies are determined by several crystals, there being one crystal used to determine each frequency of said several frequencies.

9. Radio apparatus as defined in claim 8 wherein several crystals are used in one oscillator for tuning the receiver.

10. Radio apparatus comprising a radio receiver, said receiver being tunable to several different frequencies, means for stepping said receiver through said several frequencies in a regular order, means for locking said receiver on a given frequency as long as there is a signal received on that frequency, and for causing automatic resumption of said stepping after the signal ceases, means for causing said stepping to be automatic, means for visually indicating the frequency to which the receiver is tuned, squelch means for automatically muting the audio during said automatic stepping, and switch means for manually causing the locking means of the receiver to be unresponsive to signals on any desired single one or on any desired plurality of the frequencies during said automatic stepping.

11. Radio apparatus as defined in claim 10 wherein the switch means includes several switches there being one switch associated with each frequency of said several frequencies.

12. Radio apparatus as defined in claim 11 in which said indicating means includes several lights, there being one light associated with each frequency of said several frequencies to indicate the channel to which the receiver is tuned.

13. Radio apparatus as defined in claim 12 in which each of said indicator lights is arranged to be fully energized at all times that the radio is tuned to the respective frequency.

14. Radio apparatus as defined in claim 10 in which said several frequencies are determined by several crystals, there being one crystal used to determine each frequency of said several frequencies.

15. Radio apparatus as defined in claim 14 wherein several crystals are used in one oscillator for tuning the receiver.

16. Radio apparatus as defined in claim 10 in which said stepping means comprises a digital counter and a multivibrator driving said digital counter.

17. Radio apparatus as defined in claim 16 wherein said switch means includes several switches, there being one of said several switches associated with each frequency of said several frequencies, said radio apparatus additionally comprising means coupling said counter to said switches and to said crystals, said counter being arranged upon actuation by said multivibrator to deliver a signal in a regular order to said coupling means, said coupling means being associated with respective ones of said switches and respective ones of said crystals whereby the opening of any desired one or more of said switches prevents said counter from delivering a signal through the switch to the respective crystal.

18. Radio apparatus as defined in claim 17 in which said indicating means includes several indicator lights, each of said indicator lights being connected to said coupling means and controlled by a respective one of said switches whereby said indicator lights indicate which of said crystals is operating and the frequency to which said radio apparatus is tuned.

* * * * *